United States Patent [19]

Cowen

[11] Patent Number: 5,374,850

[45] Date of Patent: Dec. 20, 1994

[54] APPARATUS AND METHOD FOR TIDAL AND WAVE GENERATION OF POWER

[76] Inventor: Hal C. Cowen, 127 W. 23rd St., Panama City, Fla. 32405

[21] Appl. No.: 128,910

[22] Filed: Sep. 29, 1993

[51] Int. Cl.$^5$ .................. F03B 13/12; F03B 13/10; F04B 35/00

[52] U.S. Cl. ................................ 290/53; 290/42; 417/333

[58] Field of Search ............... 290/42, 53; 417/333

[56] References Cited

U.S. PATENT DOCUMENTS

| | | | |
|---|---|---|---|
| 1,523,031 | 1/1925 | Mitchello, Jr. | 417/333 |
| 1,665,140 | 4/1928 | Master | 290/53 |
| 1,763,191 | 6/1930 | Sealy et al. | 417/333 |

*Primary Examiner*—A. D. Pellinen
*Assistant Examiner*—Robert Lloyd Hoover
*Attorney, Agent, or Firm*—George A. Bode; D. Neil LaHaye

[57] ABSTRACT

An apparatus for producing useful energy from the potential energy stored in a deep body of water using tidal and/or wave forces. A hollow base supported above the sea bottom slidably receives a piston therein. A first cylinder is rigidly attached at its lower end to the piston and at its upper end to a floating structure so that the floating structure and piston move vertically in response to wave and/or tidal action and which can be fixed at any position therealong by locking pins. The base is provided with one-way valves on its upper and lower end that only allow water to exit the base through the valves. Water enters the base through a one-way valve in the first cylinder and a tube in the first cylinder. A turbine positioned in the tube is driven by the water as it travels through the tube. The turbine drives a power generator. A second cylinder in the tube that extends above the upper end of the floating structure provides for air flow into and out of the base to prevent vacuum resistance to movement of the piston and to refill with air base chambers purged of water.

10 Claims, 9 Drawing Sheets

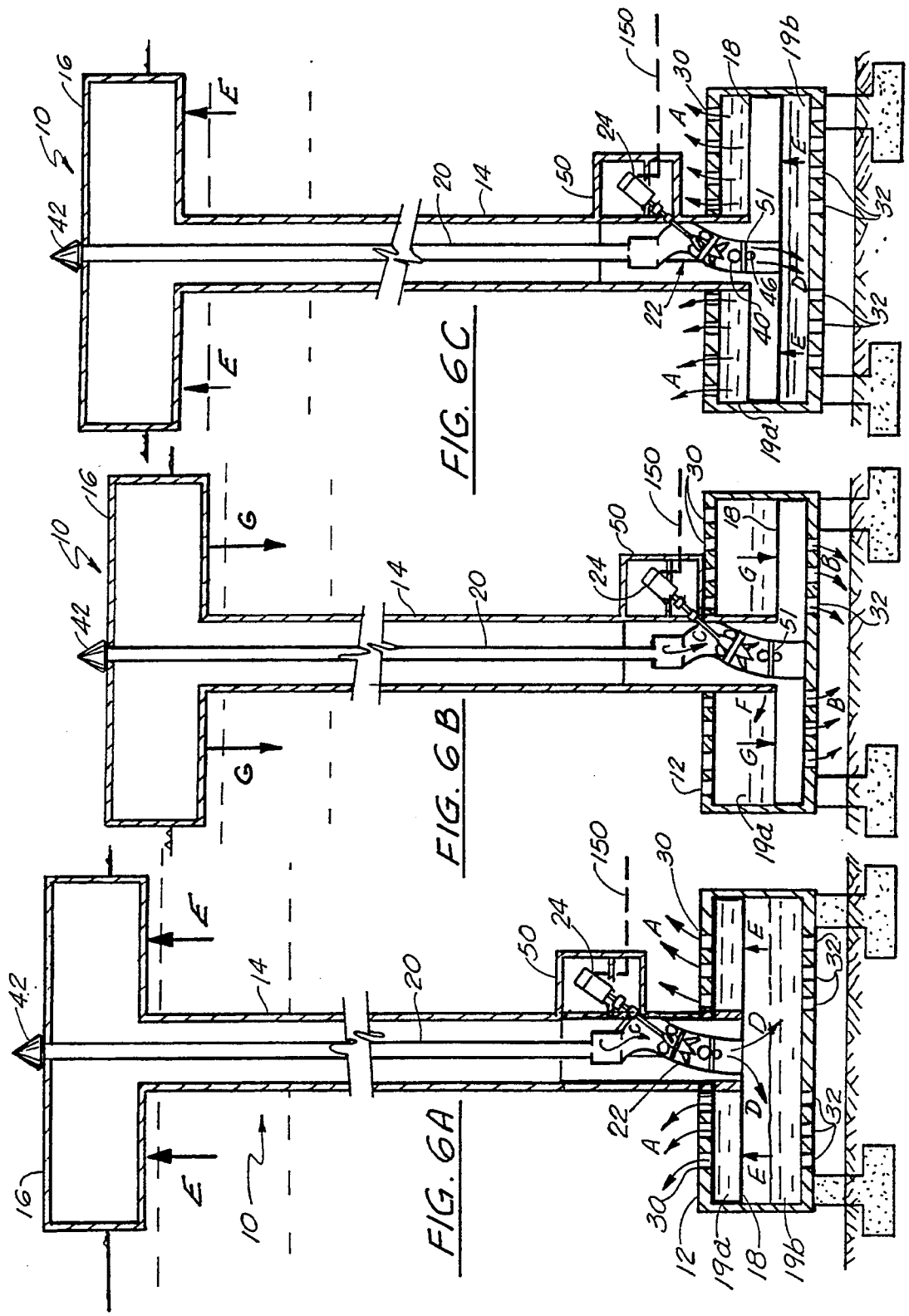

APPARATUS AND METHOD FOR TIDAL AND WAVE GENERATION OF POWER

BACKGROUND OF THE INVENTION

1. Field of the Invention

The present invention is generally related to the generation of power and particularly, to the generation of hydroelectric power by the use of a combination of tidal and wave action.

2. General Background

Energy is produced from a variety of sources such as fossil fuels, nuclear energy, solar energy, and water movement. The use of pressurized water and tidal and/or wave movement from the sea provides an energy source that is abundant and does not produce waste products that present pollution problems. Patents related to energy production from the sea that applicant is aware of include the following:

U.S. Pat. No. 1,665,140 entitled "Tide Pump" discloses the use of a float attached to a piston by a chain. As the tide rises, the float and chain move the piston to draw water into a pump cylinder. After the tide drops, a valve is opened and a weight causes the water to be discharged with great force to drive turbines. The system is useful during only one direction of tidal change and the piston acts as the driving force.

U.S. Pat. No. 1,457,170 entitled "Tidal Water Power Plant" discloses the use of turbines in conjunction with a dam where the water level on each side of the dam changes.

U.S. Pat. No. 3,668,412 entitled "Apparatus for Harnessing the Vertical Movement of Ocean Tides and Utilize the Force For Generating Electrical Energy" discloses the use of a captive float that is held in position as the tide rises and is then released at the height of the tide. The force of the rising float causes rotation of a horizontal shaft and gear for driving an electrical generator.

U.S. Pat. No. 4,249,085 entitled "Tide Operated Power Generating Apparatus" discloses the use of a float to drive a generator where the float is filled with water during the rising tide to increase its dead weight. The float is emptied of its water before the outgoing tide to increase its force in driving the generator.

U.S. Pat. No. 4,327,296 entitled "Wave-Powered Motor" discloses an atoll structure that causes spiralling pulses created from waves to enter a central aperture in a vertical standpipe. The rotational energy of the water is used to drive a shaft and turbine attached to the shaft for producing energy.

U.S. Pat. No. 4,341,959 entitled "Wave Energy Power Station" discloses the use of two water filled chambers in communication at the bottom. Overflow between chambers is used to draw in and compress air which drives an air turbine.

U.S. Pat. No. 4,369,375 entitled "Power Generation From Tidal Changes" discloses the use of chambers with ports and a turbine mounted on a float such that the turbine is capable of receiving water from the ports in sequence as the float rises or falls in response to tidal changes.

U.S. Pat. No. 4,425,510 entitled "Method And Apparatus For Tidal Generation Of Power" discloses the use of movable and fixed containers. A plunger in the movable container compresses liquid in the fixed container, causing it to overflow into a gravity feed trough for driving a turbine operably connected to the trough.

Although there are a number of patents related to the production of energy from tidal or wave action, some require confined areas near land that have large tidal ranges. This requires extensive dams that produce land management, ecological, and financial problems. They also do not make use of the advantages that greater water depth offers. This leaves a need for improved apparatus and methods for producing energy from the sea through tidal and wave action, which offers greater potential for the future.

SUMMARY OF THE PRESENT INVENTION

The present invention addresses the above need in a simple and straightforward manner. What is provided is an apparatus and method for generation of usable energy that takes advantage of the pressure head at depth during tidal changes to express stored water. A sealed hollow base supported on the sea bottom has a movable piston received therein for vertical movement. A cylinder attached to the piston and slidably and sealingly received in the top of the base extends upwardly to the water surface. A floating structure or barge is attached to the top of the cylinder. A second cylinder slidably attached to the floating structure extends down the cylinder and is rigidly attached to the piston. One-way valves in the top and bottom of the base are provided only to allow water to exit at the top and bottom of the base. Water entering the second cylinder through a one-way valve in the first cylinder fills the base as the floating structure and piston move up and down in response to tidal and/or wave action. The turbine housed in the second cylinder is driven by the water pressure at the depth at which the turbine is placed. Depending upon this depth, the amount of energy produced by the turbine varies, as the deeper the turbine, the more energy that can be produced, this energy being independent of tidal ranges. The deeper water also helps to cool the power generating equipment and this increases turbine efficiency.

BRIEF DESCRIPTION OF THE DRAWINGS

For a further understanding of the nature and objects of the present invention, reference should be had to the following description in which like reference numerals are used to refer to like parts in the accompanying drawings and wherein:

FIGS. 6A–C are side partially cross-sectional and partially cutaway views illustrating the operational sequence of the embodiment of FIG. 1;

DETAILED DESCRIPTION OF THE PREFERRED EMBODIMENT

Figure 1:
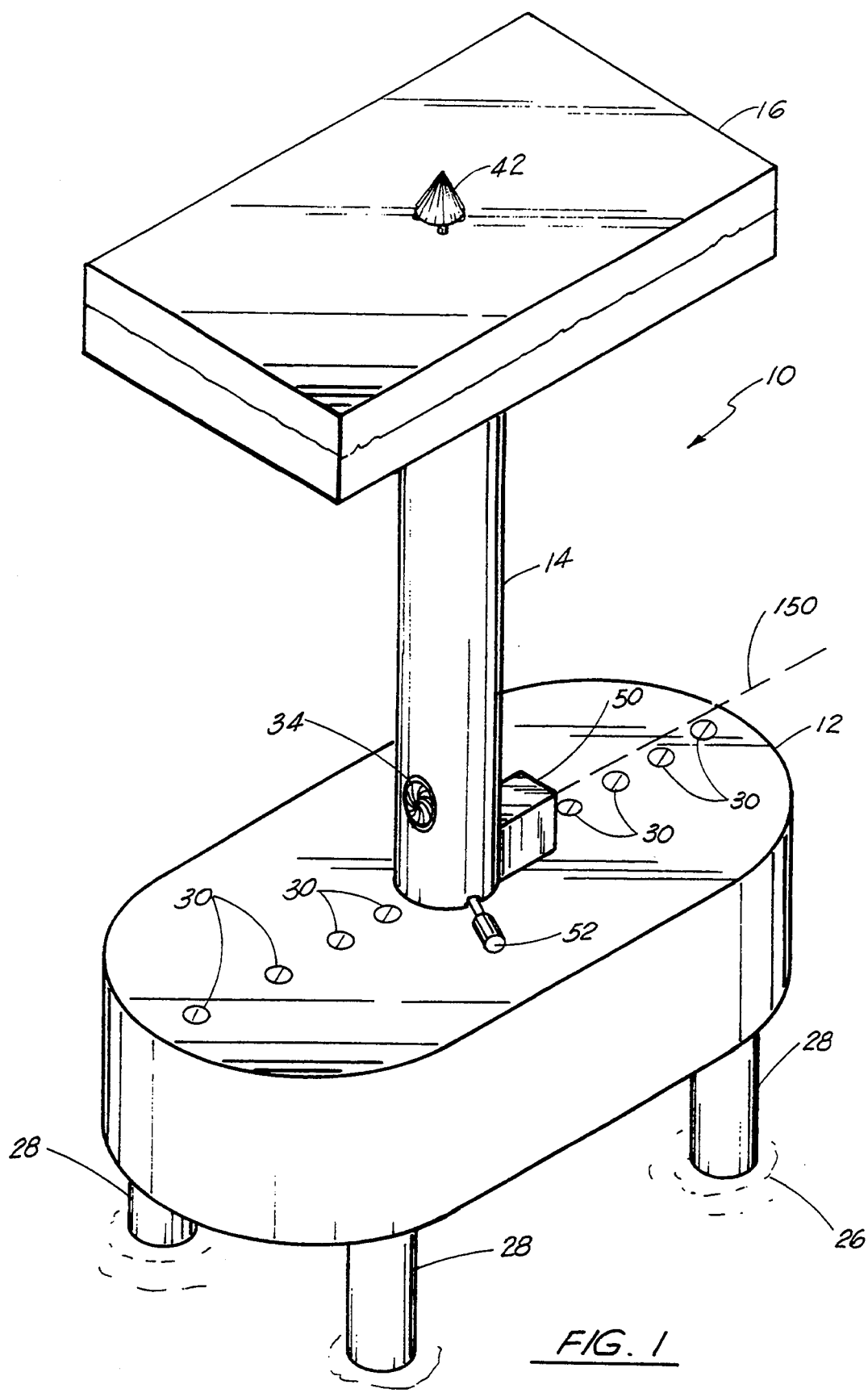
FIG. 1 is a perspective view of the preferred embodiment of the apparatus of the present invention.

Referring now to the drawing, it is best seen in FIG. 6A-C that the invention is generally referred to by the numeral 10. Apparatus 10 for tidal and wave generation of power is generally comprised of base 12, first cylinder 14, floating structure or barge 16, piston 18, second cylinder 20, turbine 22, and power generating means 24.

Figure 2:
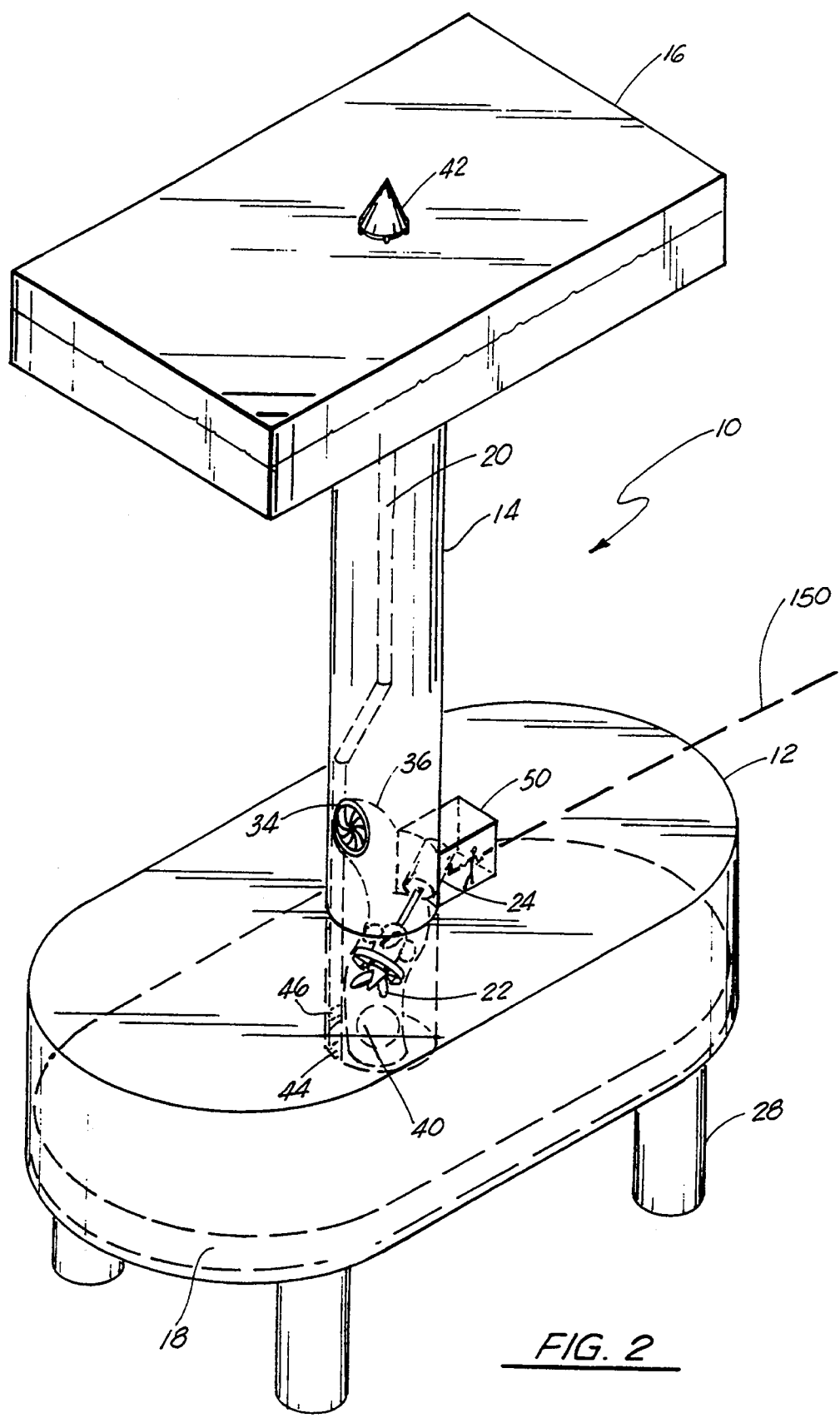
FIG. 2 is the same perspective view of the embodiment of FIG. 1, but illustrates the inner structure (IN PHANTOM) thereof.

FIGS. 1 and 2 illustrate the invention in solid and partial phantom views. As seen in FIGS. 2-6, base 12 is a hollow structure that may be of any suitable shape and size. Base 12 is rigidly attached to and supported above the sea floor 26 by any suitable support structures 28 such as columns or pilings driven into the sea floor. As best seen in FIG. 1 and the detail view of FIG. 4, base 12 is provided with a plurality of one-way valves 30 and 32. Valves 30 on the upper side of base 12 and valves 32 on the lower side of base 12 are one-way valves that operate only to allow water to exit base 12 in response to force created by movement of piston 18. As seen in FIG. 6A and 6C, water is forced out (ARROWS A) of base 12 through upper valves 30 during upward movement of floating structure 16 and piston 18 but no water is allowed into base 12 through lower valves 32. As seen in FIG. 6B, water is forced out (ARROWS B) of base 12 through lower valves 32 during downward movement of floating structure 16 and piston 18 but no water is allowed into base 12 through upper valves 30. The purpose of this arrangement of one-way valves will be explained in greater detail below.

Figure 5:
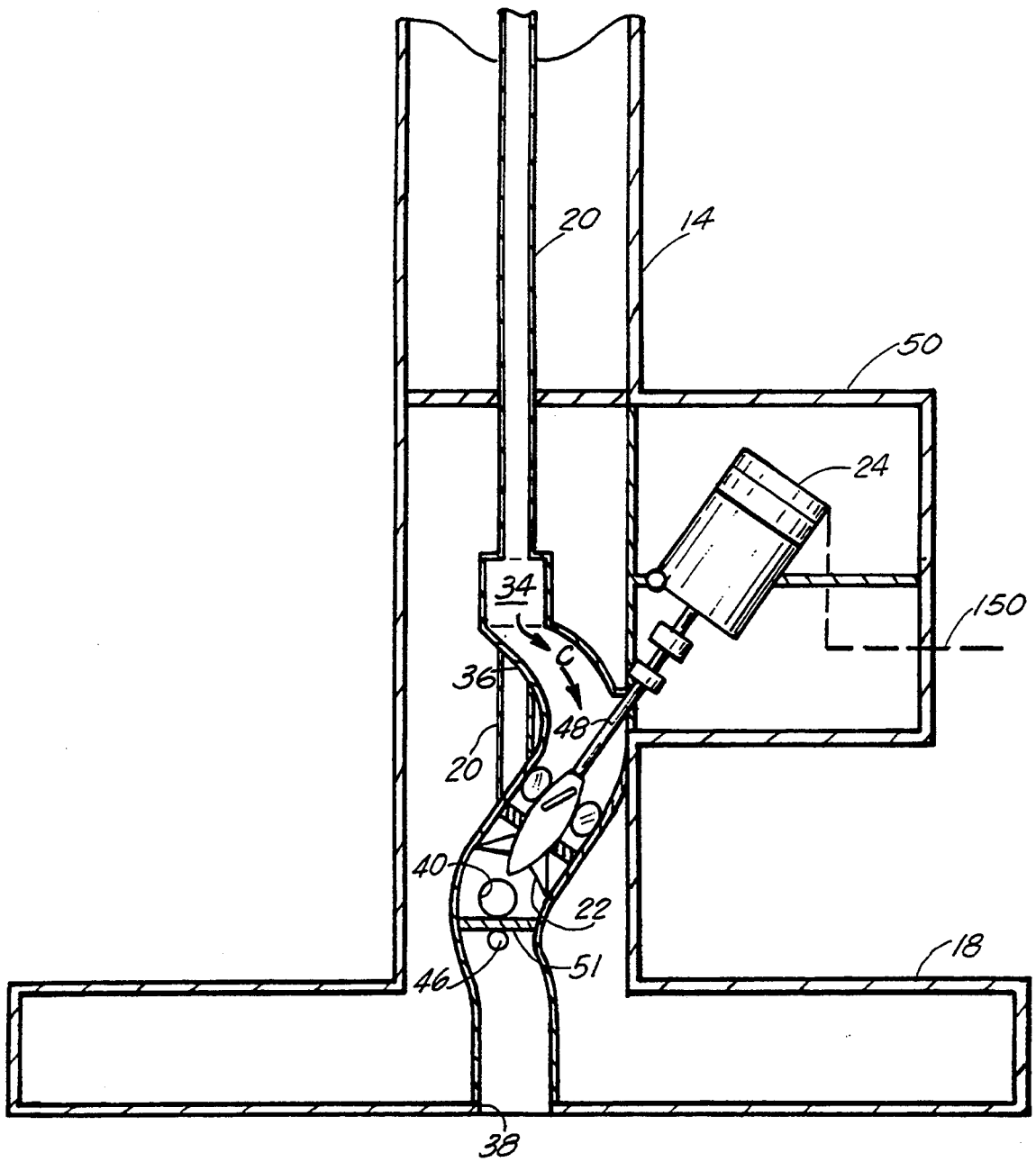
FIG. 5 is an enlarged view of the lower portion of FIG. 3.

First cylinder 14 is hollow and is rigidly attached at its first or upper end to floating structure 16 and at its second or lower end to piston 18. This floating structure could be detached in case of severe weather causing intense sea states. Piston 18 defines chambers 19a, 19b (19a above and 19b below piston 18) in base 12 that change in volume as piston 18 moves up and down in base 12. First cylinder 14 is constructed from a material suitable for use in water and that is able to withstand the natural forces encountered in open seas. As seen in FIGS. 1, 2, and the detail view of FIG. 5, first cylinder 14 is provided with a one-way valve 34 that is set to only allow water to enter into first cylinder 14. The water is received from the body of water and is forced into curved tube 36 that houses turbine 22 (ARROWS C). The pressurized water drives turbine 22 as it travels down tube 36. As seen in FIG. 5, two outlet ports or water exits 38, 40 are provided in tube 36. First water exit 38 is through the bottom of piston 18 and communicates with chamber 19b and second water exit 40 is at a horizontal position through first cylinder 14 above the top of piston 18 where tube 36 and first cylinder 14 are in fluid communication. Water exits first water exit 38 into chamber 19b of base 12 below piston 18 (ARROWS D of FIGS. 6A and 6C) when piston 18 is moving upwardly (ARROWS E). Water exits second water exit 40 into chamber 19a of base 12 (ARROW F of FIG. 6B) above piston 18 when piston 18 is moving downwardly (ARROWS G). These actions are illustrated by ARROWS D-G in FIG. 6A-C and are controlled by gate 51, best seen in FIG. 5, located in tube 36. Piston 18 is sized to be closely received in base 12 for vertical sliding movement therein and sealed around its perimeter to prevent fluid communication between chambers 19a, 19b.

Figure 3:
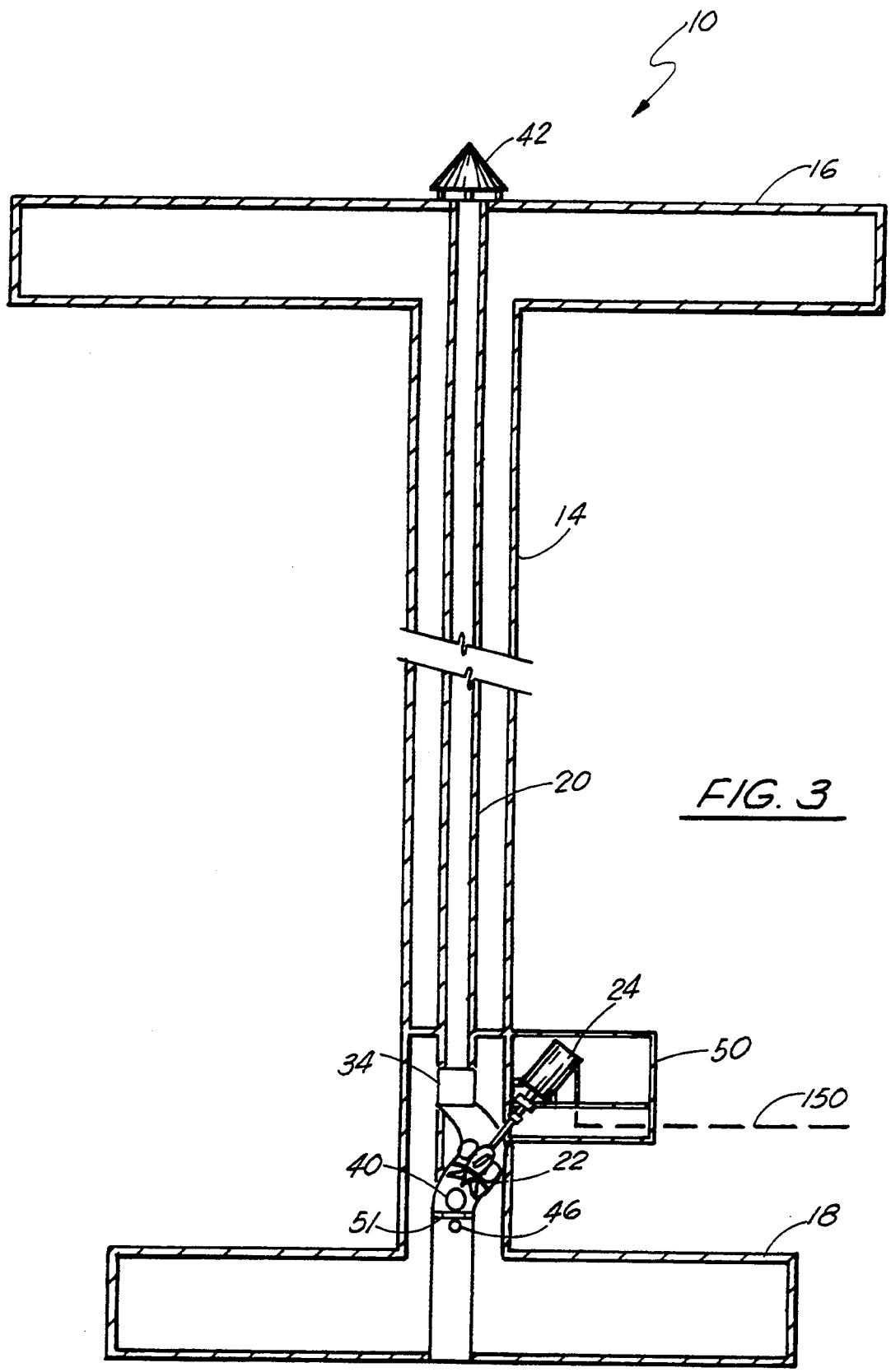
FIG. 3 is a side partially cross-sectional and partially cutaway view of piston, cylinders, barge, turbine and power generating means of the embodiment of FIG. 1.
Figure 4:
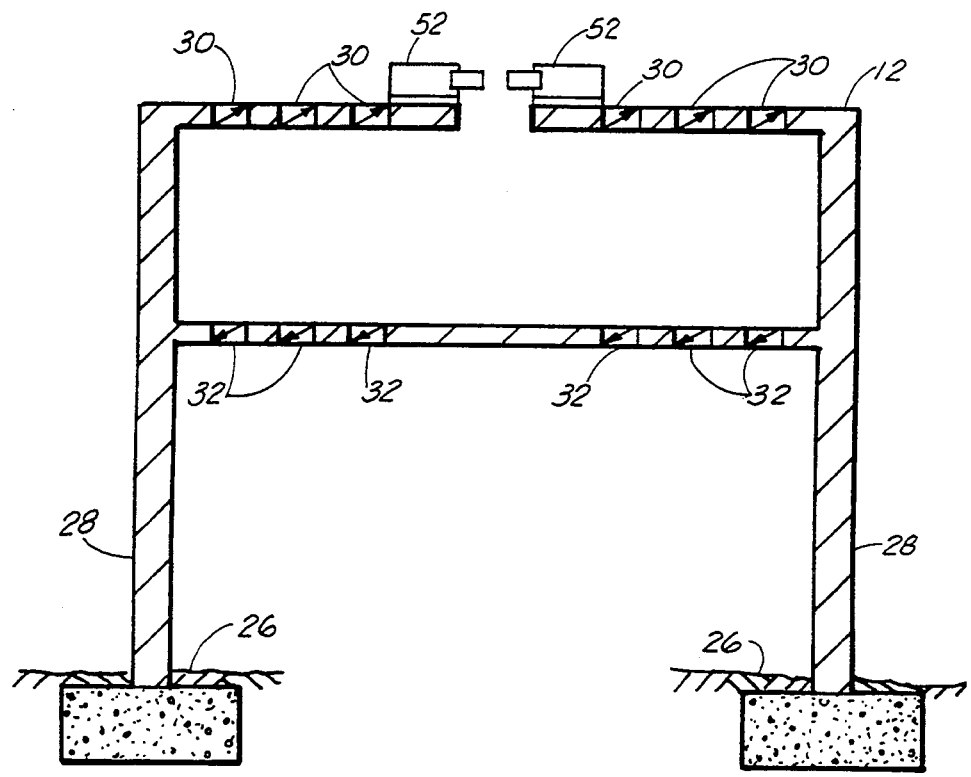
FIG. 4 is a side partially cross-sectional and partially cutaway view of the base of the embodiment of FIG. 1.

Referring to FIGS. 1-3, it is seen that the upper end of second cylinder 20 exits at the top of floating structure 16 and is provided with a vent cap 42 at its upper end that allows air flow into and out of second cylinder 20, but prevents water or debris from entering second cylinder 20. Second cylinder 20 extends through first cylinder 14 to the lower end of piston 18. Second cylinder 20 is provided with two air passages 44 and 46 at and adjacent its lower end. First air passage 44 is at the lower end below passage 46 and is at the bottom of piston 18 while second air passage 46 is above piston 18. This allows for the movement of air into and out of the chambers 19a, 19b defined in base 12 that results during movement of piston 18. These actions are controlled by gates which open and close to allow passage of air at appropriate times.

Turbine 22 is designed and positioned at the most desirable position to make efficient use of the water flowing across the turbine blades during movement of water through tube 36. The drive shaft 48 of turbine 22 is connected to power generating means 24. Power generating means 24 is housed in a water tight compartment 50 that contains the power generating and maintenance facilities therefor. The power generating means 24 may be connected to land based stations in a conventional manner by undersea cables. Cable 150 best seen (in phantom) in FIGS. 1, 2, 3, 5 and 6A, 6B and 6C connects generator 24 with the load or end use (not shown) which is normally at the surface, such as on a rig or on shore. Cable 150 passes from generator 24 through sealed compartment 50 and then may be brought directly to the surface or laid along the ocean floor to a point where it is brought to the surface.

Figure 7:
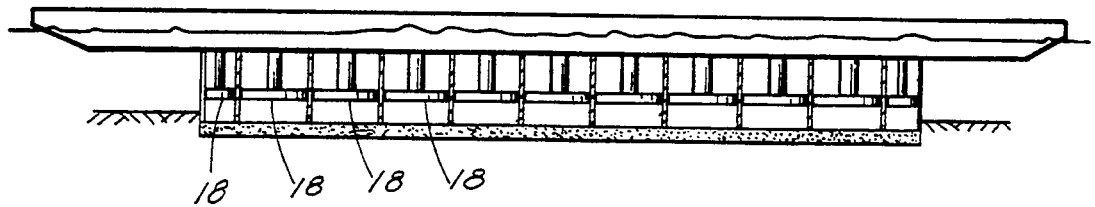
FIG. 7 is a side cutaway view partially illustrating the use of multiple pistons and bases of the apparatus of the embodiment of FIG. 1.

In operation, tidal or wave action sufficient to move floating structure 16 vertically produces the following actions that assist in the generation of power. As seen in FIG. 6A, upward movement of floating structure 16 causes corresponding upward movement (ARROWS E) of piston 18. Base 12 and piston 18 are self lubricating for ease of operation. Piston 18 forces water out (ARROWS A) of base 12 through upper one-way valves 30. Air enters the lower chamber 19b defined in base 12 through first air passage 44 in second cylinder 20 as piston 18 moves to prevent a vacuum from developing. Pressurized water enters tube 36 through one-way valve 34 (ARROWS C) in first cylinder 14 and flows past turbine 22 to cause rotation thereof which causes the production of useful energy by power generating means 24. The water enters chamber 19b of base 12 through first water exit 38 (ARROWS D) and forces the air back out first air passage 44 below piston 18. As seen in FIG. 6B, during downward movement of piston 18 (ARROWS G), the process is reversed. Means for causing water to flow across and drive turbine 22 is provided in the form of tube 36 and one-way valve 34 in first cylinder 14. Water is forced out of base 12 through lower one-way valves 32 (ARROWS B) and air enters chamber 19a in the upper portion of base 12 through second air passage 46 while water enters one way valve 34, enters and flows through tube 36, and causes turning of turbine 22. Positioning one-way valve 34 toward the lower end of first cylinder 14 takes advantage of the natural pressure head at depth to produce a powerful and consistent water flow across turbine 22. Using this pressure head effectively is the primary focus of the present invention. Air is forced out through second air passage 46 as water enters chamber 19a of base 12 through second water exit 40 (ARROW F). FIG. 6C illustrates the process starting to repeat itself. As best seen in FIG. 1, locking pins 52 are available to lock down first cylinder 14 at either peak high tide or low tide. This will increase the gravitational or buoyancy capacity of the floating structure 16 following the change in tides and also assist in filling times for the low chambers. FIG. 7 illustrates an arrangement where a number of the apparatus of the invention can be arranged in a large single operation for the creation of useful energy.

Figure 8:
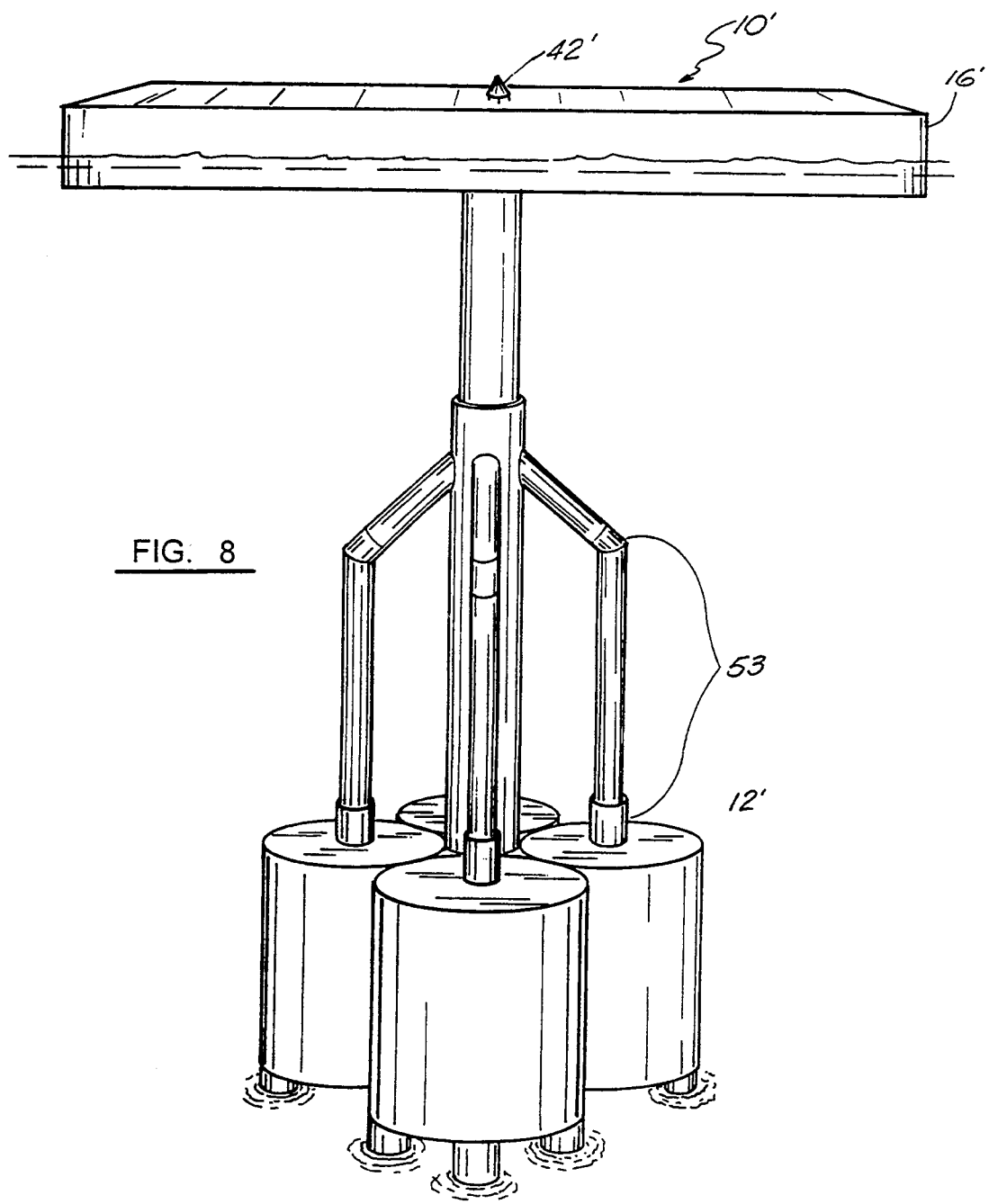
FIG. 8 is a perspective view of a lever-action, multiple-piston embodiment, illustrated at high tide.
Figure 9:
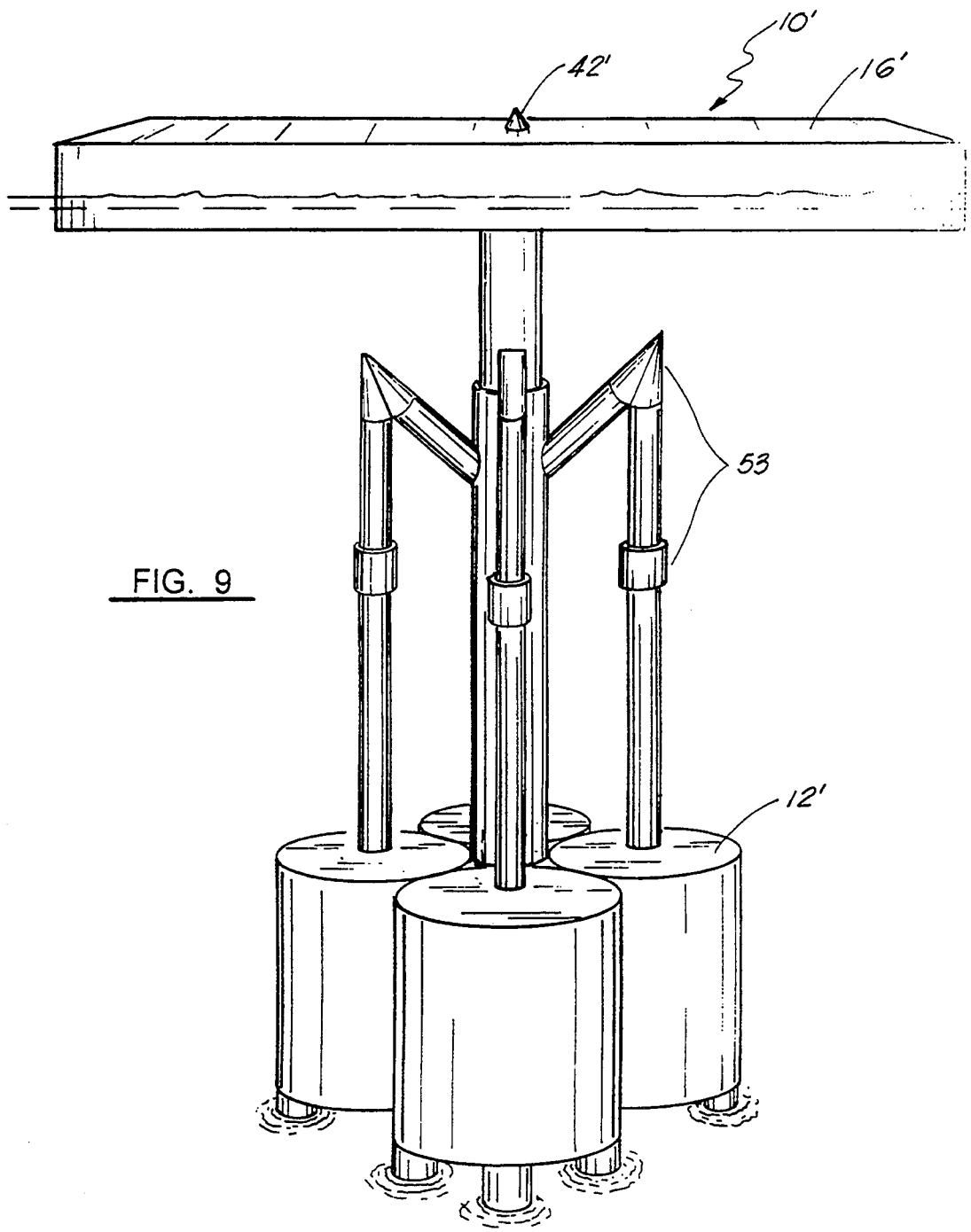
FIG. 9 is a perspective view of the embodiment of FIG. 8, illustrated at low tide; and, FIG. 10 is a perspective cutaway view of the embodiment of FIG. 8, illustrated at high tide.
Figure 10:
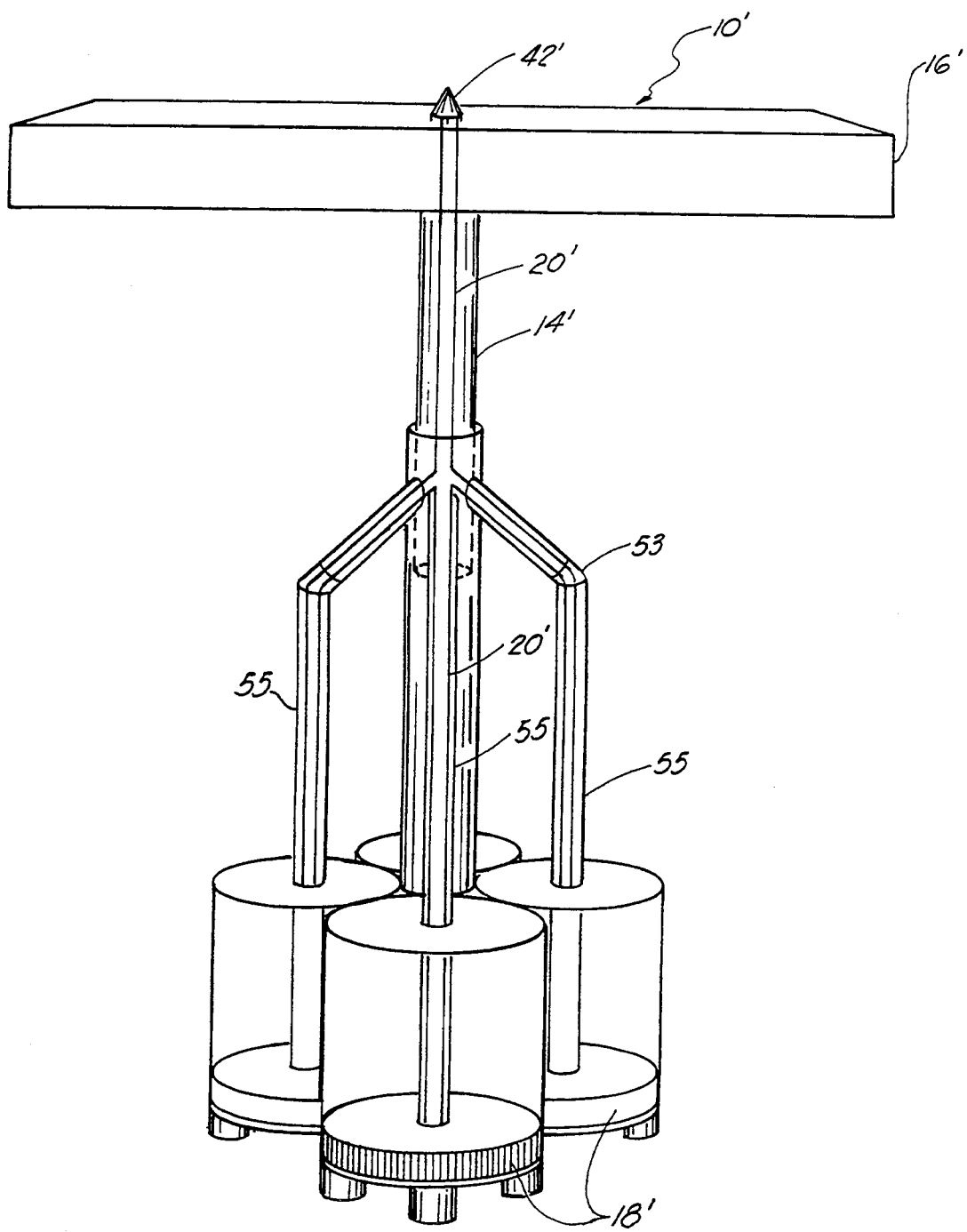

FIGS. 8-10 illustrate a second embodiment and teaches how levers can be used to multiply the number of pistons and reverse the gravitational and buoyancy forces in the piston. Pivot joints 53 allow lever arms 55 to travel up and down while pulling and pushing the piston 18' in a vertical plane.

Because many varying and differing embodiments may be made within the scope of the inventive concept herein taught and because many modifications may be made in the embodiment herein detailed in accordance with the descriptive requirement of the law, it is to be understood that the details herein are to be interpreted as illustrative and not in a limiting sense.

What is claimed as invention is:

1. An apparatus for producing energy from the potential energy stored in a deep body of water using tidal and wave action in the body of water, comprising:
   (a) a sealed base having a plurality of one-way valves provided in its upper and lower surfaces for expelling water therefrom to said body of water;
   (b) a first cylinder the lower end portion of which is slidably received within said base;
   (c) a piston rigidly attached to said lower end portion of said first cylinder and slidably movable within said base;
   (d) floating means on said body of water and rigidly attached to the upper end portion of said first cylinder;
   (e) a second cylinder slidably received through said floating means and extending within said first cylinder to the lower end portion of said piston and having therein means for allowing the flow of air from the upper to the lower end portion of said second cylinder;
   (f) a turbine positioned within a tube positioned within said first cylinder;
   (g) power generating means operably engaged with said turbine; and,
   (h) means mounted in said first cylinder for forcing water from said body of water to flow through said tube and across and drive said turbine and then flow into said sealed base from which it is expelled by the movement of said piston.

2. The apparatus of claim 1, wherein said means for allowing the flow of air through said second cylinder further comprises air passages positioned within said second cylinder above and below said piston and in communication with said base.

3. The apparatus of claim 1, wherein said second cylinder extends above the upper surface of said floating means.

4. The apparatus of claim 1, wherein said means for forcing water to flow across said turbine comprises:
   (a) said tube positioned in said first cylinder, said tube housing said turbine and being in fluid communication with said base; and,
   (b) a one-way valve provided in said first cylinder intermediate said floating means and said turbine; said one-way valve being in fluid communication with said tube, thereby allowing water to flow into said tube and across said turbine.

5. The apparatus of claim 4, wherein said tube is provided with water outlets positioned above and below said piston and in fluid communication with said base.

6. An apparatus for producing energy from tidal and wave action in a body of water, comprising:
   (a) a sealed base having one-way valves provided in its upper and lower surfaces for expelling water therefrom to said body of water;
   (b) a first cylinder slidably received in said base;
   (c) a piston rigidly attached to the lower end of said first cylinder and slidably movable within said base;
   (d) floating means on said body of water and rigidly attached to the upper end portion of said first cylinder;
   (e) a second cylinder slidably received through said floating means and extending above the upper surface portion of said floating means and within said first cylinder to the lower end portion of said piston, and having therein means for allowing the air flow from the upper to the lower end portion of said second cylinder, said means for allowing air flow through said second cylinder further comprising air passages positioned within said second cylinder above and below said piston and in communication with said base;
   (f) a turbine positioned within a tube positioned within said first cylinder;
   (g) power generating means operably engaged with said turbine; and,
   (h) means mounted in said first cylinder for causing water from said body of water to flow through said tube and across and drive said turbine and then flow into said sealed base from which it is expelled by the movement of said piston.

7. The apparatus of claim 6, wherein said means for causing water flow across said turbine comprises:
   (a) said tube positioned in said first cylinder, said tube housing said turbine and being in fluid communication with said base; and,
   (b) a one-way valve provided in said first cylinder intermediate said floating means and said turbine; said one-way valve being in fluid communication with said tube and allows water flow into said tube and across said turbine.

8. The apparatus of claim 7, wherein said tube is provided with water outlets positioned above and below said piston and in communication with said base.

9. An apparatus for producing energy from tidal and wave action in a body of water, comprising:
   (a) a sealed base having one-way valves provided in its upper and lower surfaces for expelling water therefrom to said body of water;
   (b) a first cylinder slidably received in said base;
   (c) a piston rigidly attached to the lower end of said first cylinder and slidably movable within said base;
   (d) floating means on said body of water and rigidly attached to the upper end portion of said first cylinder;
   (e) a second cylinder slidably received through said floating means and extending above the upper surface of said floating means and within said first cylinder to the lower end portion of said piston, and having therein means for allowing the air flow from the upper to the lower end portion of said second cylinder, said means for allowing air flow through said second cylinder further comprising air passages positioned within said second cylinder above and below said piston and in communication with said base;

(f) a turbine positioned within a tube positioned within said first cylinder;

(g) power generating means operably engaged with said turbine; and, (h) means mounted in said first cylinder for causing water from said body of water to flow through said tube and across and drive said turbine and then flow into said sealed base from which it is expelled by the movement or said piston, said means comprising:

i. said tube positioned in said first cylinder, said tube housing said turbine and being in fluid communication with said base; and, ii. a one-way valve provided in said first cylinder intermediate said floating means and said turbine; said one-way valve being in fluid communication with said tube and allowing water flow into said tube.

10. The apparatus of claim 9, wherein said tube is provided with water outlets positioned above and below said piston and in fluid communication with said base.

* * * * *